United States Patent
Nissim et al.

(10) Patent No.: US 11,233,834 B2
(45) Date of Patent: Jan. 25, 2022

(54) STREAMING CLICK-TO-TALK WITH VIDEO CAPABILITY

(71) Applicant: Avaya Management L.P., Santa Clara, CA (US)

(72) Inventors: Oren Nissim, Petah Tikva (IL); Erez Morabia, Holon (IL); Gilad Levi, Yavne (IL)

(73) Assignee: Avaya Management LP, Santa Clara, CA (US)

( * ) Notice: Subject to any disclaimer, the term of this patent is extended or adjusted under 35 U.S.C. 154(b) by 0 days.

(21) Appl. No.: 16/802,729

(22) Filed: Feb. 27, 2020

(65) Prior Publication Data

US 2021/0273983 A1    Sep. 2, 2021

(51) Int. Cl.
*H04L 29/06*    (2006.01)
(52) U.S. Cl.
CPC ................ *H04L 65/4038* (2013.01)
(58) Field of Classification Search
USPC ........................................... 370/260
See application file for complete search history.

(56) References Cited

U.S. PATENT DOCUMENTS

| 7,694,002 B2 | 4/2010 | Vadlakonda et al. |
| 2007/0239885 A1* | 10/2007 | Vadlakonda ............ H04M 3/56 709/232 |
| 2014/0031019 A1* | 1/2014 | Qi ........................ H04W 4/00 455/416 |
| 2019/0281096 A1* | 9/2019 | Mazzarella ............ H04N 7/152 |

* cited by examiner

*Primary Examiner* — Amal S Zenati
(74) *Attorney, Agent, or Firm* — Sheridan Ross P.C.

(57) ABSTRACT

Advances in computing and communication performance are commonly followed by applications that utilize such advances. Electronic conferences comprising audio and video may tax even the most advanced network and computing platforms when sufficient demand is placed on the conference. Accordingly, utilizing conference resources effectively and efficiently remains a concern. By allocating participating devices to either a push-to-talk group or a non-push to talk group, conference participants may selectively be enabled to contribute freely or limited to observe the conference. As a result, resources required to receive conference content from the participating devices may be allocated only to those that warrant such an allocation and not waste allocated resources that are not, or not currently, contributing to the conference content.

20 Claims, 6 Drawing Sheets

| Device Identifier | Device Role | Contribution Topics | Group |
|---|---|---|---|
| "Host" | Moderator | All | nPTT |
| 0x01E2A33 | Presentor | All | nPTT |
| user@org.com | Participant | Topic 1, 5, 8 | PTT |
| "User 1" | Observer | ad hoc | PTT |
| "Sales Team 1" | Observer | ad hoc | PTT |
| "Sales Team 2" | Participant | Topic 1, 3, 4 | nPTT |

*Fig. 2*

| Device Identifier ⌐302 | Connection ⌐304 | nPTT - submode ⌐306 |
|---|---|---|
| "User 1" | Limited (1) | Audio only |
| "User 2" | Limited (2) | Audio with placeholder image |
| "User 3" | Limited (3) | Audio with throttled video |
| "User 4" | Full | Audio-video stream |
| "User 5" | Limited (4) | Audio-video stream / throttle conference |

*Fig. 3*

STREAMING CLICK-TO-TALK WITH VIDEO CAPABILITY

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for networking communication devices and particularly to selectively establishing at least one additional communication channel.

BACKGROUND

In large conference calls with many participants, there are typically active and inactive participants. For example, inactive participants cannot speak and can only receive audio, and optionally video, provided by other, active participants on the conference call. There is no mechanism for these participants to speak in the large conference call.

One solution of the prior art is to enable the ability to speak and be heard at any time to all participants. However, for large conference calls (e.g., 10,000 participants), this requires a large number of conferencing resources which may not be available.

SUMMARY

These and other needs are addressed by the various embodiments and configurations of the present invention. The present invention can provide a number of advantages depending on the particular configuration. These and other advantages will be apparent from the disclosure of the invention(s) contained herein.

In one embodiment, and as a general introduction, methods and systems are provided for enhanced push-to-talk functionality and resource allocation/deallocation in small to extra large conference sessions.

To overcome the problem of inactive participants not being able to speak, the idea is to have non-push-to-talk (nPTT) participants and push-to-talk (PTT) participants in the same conference. For example, a presenter may be a non-push-to-talk participant who can speak at any time without using the push-to-talk option. The remaining participants have the push-to-talk option. In other words, there is a mix of non-push-to-talk participants and push-to-talk participants. The non-push-to-talk/push-to-talk participants can be defined by a profile and conference type.

In one embodiment, a push-to-talk function is provided based on a context determined by an attribute, such as an attribute associated with a user or group of users. For example, a specific user, a sub-set of the users, and/or all users may have a push-to-talk button displayed at certain times in the conference (e.g., based on a specific agenda item or slide that is being displayed (e.g., an open discussion period slide)). The context may be based on a spoken word or phrase. For example, the system may enable the push to talk option based on the presenter saying, "I will now open the meeting up for comments" (where everyone has the ability to use the push-to-talk option) or, "I would like John Smith to comment on this" (where only John Smith has the push-to-talk option).

While certain embodiments herein may be directed to conference calls with a large number of participants, smaller-sized conference calls may also utilize the embodiments disclosed. For example, when a participant places himself on mute, a push-to-talk button can be displayed to the participant where the participant can make a quick comment by selecting the push-to-talk button. After deselecting the push-to-talk button, the user returns to mute.

One advantage of the embodiments disclose is realized from allocating resources may be allocated on-demand when a participant wants or needs to speak. This reduces the resources that a conference bridge would otherwise require in order to support a conference session where more, or all, participants have unutilized resources allocated. With benefit of the embodiments disclosed herein, a resource is allocated for the participant to speak and when done, the resource is deallocated and the participant returns to streaming in listen-only (and for video, view-only) mode.

In another embodiment, a video conference call is provided with reduced resource requirements. This can be accomplished as a video directional call in which the inactive participant activates the click-to-talk option. A resource is allocated to the participant to enable a video connection in which the user can speak and provide live video to other participants briefly. Once the participant is done, he can signal for the resource to be deallocated and the participant can revert to listen/viewing streaming as before.

In one embodiment, a system is disclosed, comprising: a network interface to a network; a data storage comprising a non-transitory data storage component; and a processor; and wherein the processor performs: presenting a conference to communication devices via the network interface and wherein the conference comprises an audio portion and a video portion; accessing a data structure maintained in the data storage and determining therefrom a first subset of the communication devices and a second subset of the communication devices; directly providing the video content received from the first subset of the communication devices as at least a portion of the video component of the conference and providing the audio content received from first subset of the communication devices as at least a portion of the audio component of the conference; receiving, from a requesting communication device of a second subset of the communication devices, a request to talk signal; in response to receiving the request to talk signal, evaluating an attribute associated with at least one of the requesting communication device or a user associated with the requesting communication device; and in response to the evaluation being resolved to grant the request to talk, directly providing a video content received from the requesting communication device as at least a portion of the video component of the conference and providing the audio content received from the requesting communication device as at least a portion of the audio component of the conference; and wherein unless granted the request to talk, none of the second subset of the communication devices provides any portion of the video component of the conference nor any portion of the audio component of the conference.

In another embodiment, a method is disclosed comprising: presenting a conference to communication devices via a network and wherein the conference comprises an audio portion and a video portion; accessing a data structure maintained in a data storage and determining therefrom a first subset of the communication devices and a second subset of the communication devices; directly providing the video content received from the first subset of the communication devices as at least a portion of the video component of the conference and providing the audio content received from first subset of the communication devices as at least a portion of the audio component of the conference; receiving, from a requesting communication device of a second subset of the communication devices, a request to talk signal; in response to receiving the request to talk signal, evaluating an attribute associated with at least one of the requesting communication device or a user associated with the requesting communication device; and in response to the evaluation being resolved to grant the request to talk, directly providing a video content received from the requesting communication device as at least a portion of the video component of the conference and providing the audio content received from the requesting communication device as at least a portion of the audio component of the conference; and wherein unless granted the request to talk, none of the second subset of the communication devices provides any portion of the video component of the conference nor any portion of the audio component of the conference.

In another embodiment, a communication device is disclosed comprising: a network interface to a network; a processor; a display component; an audio output component; an audio input component; a video input component; a signaling component; and wherein the processor, via the network interface, receives a data stream of a conference for presentation of an audio portion of the conference by the audio component and presentation of a video portion of the conference by the video component; wherein the processor transmits a signal, via the network interface to the conference server and in response to a user input to the signaling component; and the processor activates, in response to receiving an acknowledgement from the conference server in response to the signal, the video input component and wherein the video input component provides at least a portion of the video portion of the conference; and wherein the processor further activates, in response to receiving an acknowledgement from the conference server in response to the signal, the audio input component and wherein the audio input component provides at least a portion of the audio portion of the conference and the video input component wherein the video input component provides at least a portion of the video portion of the conference.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIG. 2 depicts a first data structure in accordance with embodiments of the present disclosure;

FIG. 3 depicts a second data structure in accordance with embodiments of the present disclosure;

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
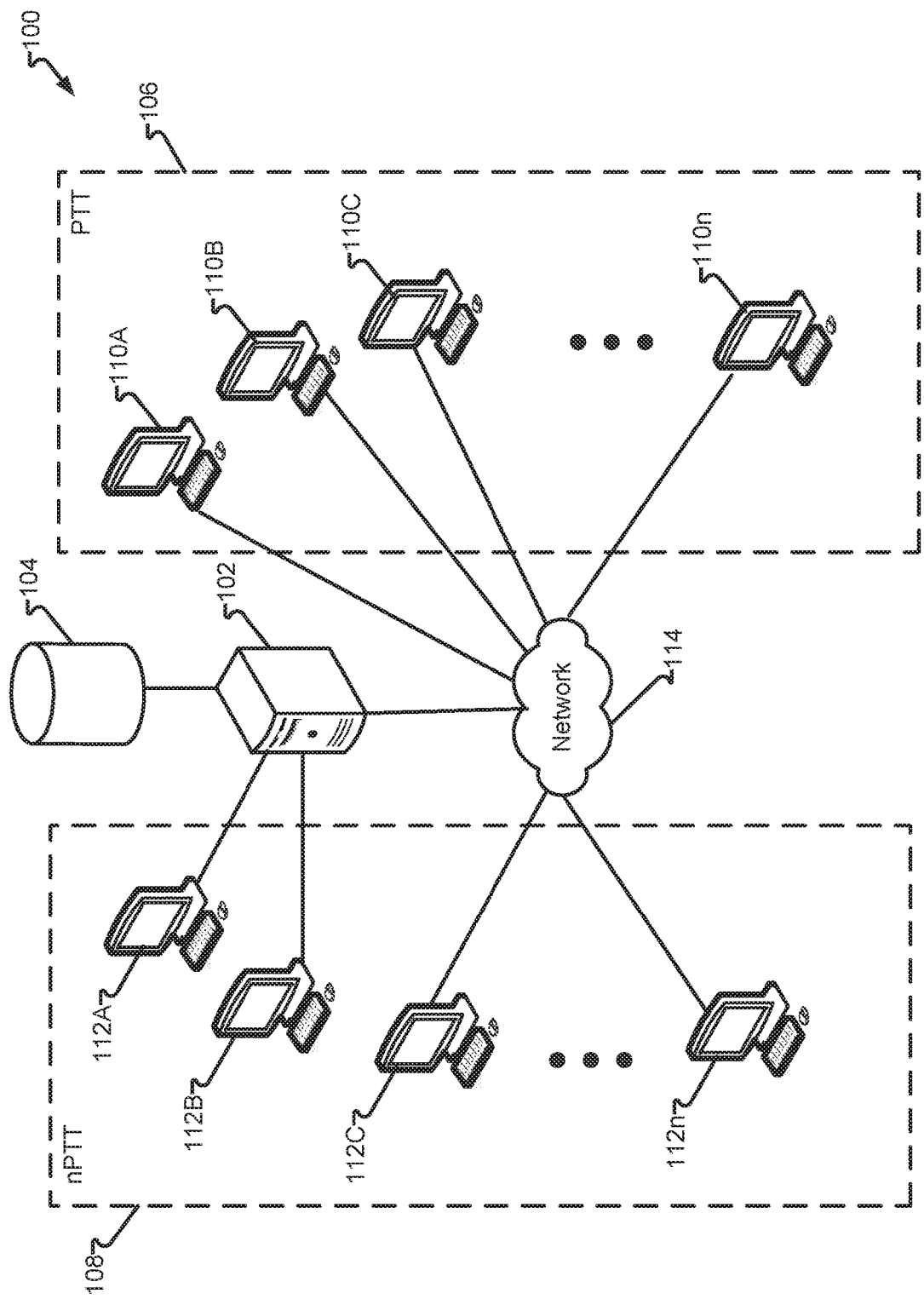
FIG. 1 depicts a first system in accordance with embodiments of the present disclosure.

FIG. 1 depicts system 100 in accordance with embodiments of the present disclosure. System 100 illustrates one network topology that may result from embodiments described herein. More specifically, system 100 illustrates non-PTT communication device 112A and non-PTT communication device 112B connected to conference server 102, such as via a direct connection or a network different from network 114, such as an intranet, while PTT communication devices 110A-n and non-PTT communication device 112A-n are each connected to conference server 102 via network 114. Network 114 may comprise a public network (e.g., internet), private network (e.g., analog or digital telephone, intranet, WiFi, ethernet, cellular), or other data-carrying network or combinations thereof. Additionally, while conference server 102 and storage device 104 are illustrated as distinct hardware components, one or both may be integrated into a particular instance of non-PTT communication device 112, such as non-PTT communication device 112A or, in another embodiment, into one of PTT communication device 110, such as when a host is not a participant of a particular conference.

Conference server 102 presents conference content to communication devices participating in the conference. Each participating device comprising PTT communication devices 110 and non-PTT communication devices 112. Conference server 102 presents audio, via encoded audio signals, video, via encoded video signals, and optionally still images, recorded media, documents, co-browsing, etc. In another embodiment, conference server 102 presents audio and/or video content, as a portion of the conference content, that was received by one or more PTT communication device 110 and/or non-PTT communication device 112. For example, a user associated with non-PTT communication device 112A may be a moderator or host of a presentation and have their speech captured by a microphone (not shown) and image captured by a camera (not shown) of non-PTT communication device 112A and presented to each participating device. Conference server 102 may access data structures from storage device 104, which may be embodied as an internal or external storage device, distributed storage device (e.g., "cloud", network attached storage, array, etc.), memory device, memory circuitry, or other non-transitory device. Storage device 104 may be a discrete device(s) or co-integrated with conference server 102 and/or one of PTT communication device 110 or non-PTT communication device 112. Additionally or alternatively, conference server 102 may comprise or control connectivity management logic/hardware, floor control, agenda control, and/or other conference connectivity and content management functionality.

PTT communication devices 110 and non-PTT communication devices 112 are illustrated as networked personal computers for simplicity. At a minimum, each PTT communication device 110 and non-PTT communication device 112 comprises a network interface (e.g., wires to send/receive electrical signals, network interface card/chip to send/receive data packets, antenna to send/receive electromagnetic signals (RF, infrared, etc.), or otherwise configured to operate as a node on network 114 and convert signals received into images and sound waves and vice versa, via circuitry which may comprise one or more of a microprocessor or microprocessors ("processor"), analog-to-digital/digital-to-analog converter(s), camera (e.g., charged coupled device), display component (e.g., LED display), and/or mechanical-electrical converter (e.g., speaker, microphone, Braille input/output device).

Different or heterogeneous mixtures of device types are also contemplated herein. For example, one or more of PTT communication devices 110 or non-PTT communication devices 112 may be embodied as a stand-alone personal computer (as illustrated), voice only telephone, smart phone, or other device comprising a network interface. As will be described more completely with respect to embodiments that follow, one or more and preferably all PTT communication devices 110 and/or non-PTT communication devices 112 are embodied to comprise a camera to capture video images of a user and/or other graphical information associated with a particular PTT communication device 110 or non-PTT communication device 112, a display to present a video portion of a conference presented by conference server 102, a speaker to present an audio portion of a conference presented by conference server 102, and a microphone to capture sound (speech of the user associated with the particular PTT communication device 110 or non-PTT communication device 112). For any one, but less than all, PTT communication device 110 or non-PTT communication device 112 that is absent video capacity, that is one or both of the ability to present the video portion of the conference and/or transmit video/graphical images to the conference server 102, then such functionality will not apply to such devices. For example, such a device (e.g., a voice-only telephone) may allow a participant to listen and optional speak to a conference presented by conference server 102.

Unless otherwise noted, the embodiments that follow are directed towards PTT communication devices 110 and non-PTT communication devices 112 that are configured to receive and present video (e.g., on an attached or integrated video display device) to their associated user and optionally configured to capture and transmit video content to conference server 102.

In another embodiment, when a participating device is categorized into non-push-to-talk group 108 (i.e., non-PTT communication device 112), any audio-video signal received by conference server 102 is directly incorporated into the content of the conference for streaming by conference server 102 to the participating devices. When conference server 102 directly provides the audio-video conference, no further gating is performed as to determine whether or not the received audio-video signal is to be incorporated into the conference. In other words, gating may be performed on the device itself, for example, non-PTT communication device 112A may have the audio input set to "mute" and/or a camera deactivated, however, if the camera and/or microphone are enabled, then the user is "live" on the presentation and whatever anything seen by the camera or heard by the microphone will be integrated into the conference by conference server 102 and no means or mechanism to gate or otherwise omit the signals from being incorporated into the conference.

In contrast, when a participating device is categorized as push-to-talk group 106, conference server 102 ignores any audio-video signals received from member devices (i.e., PTT communication device 110). However, in another embodiment, a PTT communication device 110 may signal conference server 102 of a desire to contribute audio and/or video content to the conference (i.e., push-to-talk). In one embodiment, all push-to-talk requests are immediate granted. In another embodiment, push-to-talk requests are evaluated by a processor of conference server 102 and granted/denied in accordance with the evaluation of a value for an attribute against a rule to make the determination.

Conference server 102 may access rules to determine who is or is not allowed to contribute content to grant or deny such an ability. In another embodiment, conference server 102 may receive and enqueue requests to talk in a particular order (e.g., FIFO) or prioritized (e.g., individuals, via their respective PTT communication device 110, indicating that they have content or a role related to a particular topic currently under discussion, higher ranking member users, etc.). Optionally, and in another embodiment, conference server 102 may receive a signal, such as from a participating device associated with a moderator to grand or deny the request to talk.

When a push-to-talk requests is granted, the device is recategorized as a member of non-push-to-talk group 108. Optionally, a request-to-talk may be granted and then revoked upon a particular event, such as after a given period of time, after a given period of time following an absence of content being provided, upon a subsequent request by a subsequent PTT communication device 110, etc. As a benefit, resources required to accommodate conference content input (e.g., audio/video) may be less than the total number of participating devices while still allowing individuals who wish to contribute to be able to do so, either continually throughout the conference (e.g., a presenter) or intermittently (e.g., a participant with a question). Revocation moves the device from non-push-to-talk group 108 to push-to-talk group 106. In a further embodiment, no PTT communication device 110 contributes content. Conference server 102, therefore, only manages the streaming out of the conference to each of PTT communication device 110 and the receiving of the push-to-talk request from individual PTT communication device 110.

Conference server 102 allocates limited resources (e.g., ports, video channels, audio channels, overall bandwidth, etc.) to receive conference content from non-PTT communication devices 112. Should the number of resources be at its limit, conference server 102 may deny or enqueue subsequent push-to-talk requests, remove a current non-PTT communication device 112 to become one of PTT communication device 110, such as upon determining that content has been absent for a period of time from a particular non-PTT communication device 112. Conference server 102 may have exceptions, for example, non-PTT communication device 112B may be associated with a particular presenter that may include period of time where content is provided by others, however, as the presenter may wish to interrupt or otherwise provide content quickly (e.g., acknowledge a point, point out a mistake, etc.), the particular non-PTT communication device 112 associated with a particular presenter may be prioritized or otherwise excluded from being moved into push-to-talk group 106.

FIG. 2 depicts data structure 200 in accordance with embodiments of the present disclosure. Data structure 200 comprise a number of records 210 each having a number of fields. Fields of data structure 200 may include device identifier 202, device role 204, contribution topics 206, group identifier 208, and/or other fields as a matter of design choice. Device identifier 202 of each record 210 identifies a device via an appropriate identifier. For example, record 210A utilizes "Host" to identify a particular device associated with the host of a conference, which may also be operating as conference server 102. In other embodiments, device identifier 202 may comprise an address (e.g., record 210B), network address (e.g., record 210C), user identifier (e.g., record 210D), functional group (e.g., record 210E and record 210F), and/or other identifier that is uniquely identifies a participant device to conference server 102.

In one embodiment, data structure 200 may be accessed by a processor of conference server 102, as a component of process to categorize participant devices into as PTT communication device 110, in push-to-talk group 106, and non-PTT communication device 112, in non-push-to-talk group 108. Participating devices may be statically categorized into one group, such as a "presenter" or "host" non-PTT communication device 112, or dynamically moved between non-push-to-talk group 108 and push-to-talk group 106, such as during a meeting with agenda items wherein certain participants contribute to the conference with regard to a particular topic or agenda items being currently discussed. Observing participants, and their associated participating device, may be identified as "ad hoc" and maintained within push-to-talk group 106 unless requested. For example, PTT communication device 110C may be utilized by "User 1" (record 210E) wherein contribution topics 206 is identified as "ad hoc" and group identifier 208 identified as "PTT" (push-to-talk). Accordingly, the user associated with device "User 1" may initiate a signal sent to conference server 102 to indicate a desire to contribute to the conference. If granted, PTT communication device 110 is added to non-push-to-talk group 108 and removed from push-to-talk group 106, such as by changing group identifier 208 to "nPTT". Then conference server 102 then allocate communication resources (e.g., ports, bandwidth, etc.) accordingly to enable conference server 102 to receive conference content from PTT communication device 110C and provide the received conference content to each of the participating devices. Additionally or alternatively, a participating device may be moved from non-push-to-talk group 108 to push-to-talk group 106, such as by signaling conference server 102 that they have completed speaking, being silent for a period of time beyond a previously determined limit, etc. Determining to move one or more participating devices from non-push-to-talk group 108 to push-to-talk group 106 may be made, at least in part, on the demand or current utilization of the conferencing resources, as will be described more completely with respect to data structure 300.

FIG. 3 depicts data structure 300 in accordance with embodiments of the present disclosure. In one embodiment, data structure 300 comprise a number of records 308A-E each having a number of fields. Fields of data structure 300 may include device identifier 302, connection field 304, nPTT-submode 306, and/or other fields as a matter of design choice. One object of the current disclosure is to utilize limited conference resources effectively and allow those contributing to the conference to do so as effortlessly as possible and omitting the allocation of resources utilized for contributing to the conference to participating devices associated with users who are not contributing or at least not presently contributing. When resources are allocated to contributing participating devices, that is, those in non-push-to-talk group 108, the resources allocated may vary. For example, "User 1" (record 308A) may have a connection (connection field 304) of "Limited (1)" which may be known to conference server 102 as an audio-only telephone device, and if moved into non-push-to-talk group 108, be connected via audio only and omit allocation of video resources or otherwise make the video resources available for another purpose.

Connection field 304 and associated nPTT-submode 306 may comprise records 308A-E for participating devices having full connection type (connection field 304 or record 308D) whereby the maximum allocated resources are utilized when participating device known as "User 4" is categorized into non-push-to-talk group 108. However, not all participating devices have the same capabilities. As discussed above, some may be audio-only telephones. Other participating devices may have restricted bandwidth and to give full allocation of bandwidth, such as high resolution audio and video that demands a very high bitrate, may waste resources. Accordingly, nPTT-submode 306 and/or connection field 304 may identify limits of resource allocation. Data structure 300 illustrates "User 2" (record 308B) is to have audio and only a placeholder image (nPTT-submode 306). The placeholder image may be a single frame of video captured, a stored still image, or other graphic, such as a silhouette or text, such as "image not available." For "User 3" (record 308C), audio is provided but video is throttled (nPTT-submode 306). Throttling video may reduce the frame size, frame rate, reduce the number of pixels, reduce the depth of colors, or other means by which video may be provided at a less-than-maximum rate of conference server 102. Participating device may be unable or unduly burdened to both contribute conference content and receive the streamed conference. Accordingly, "User 5" (record 308E), if categorized as non-push-to-talk group 108, may contribute audio and video but while doing so, conference server 102 restricts or omits sending the conference content. Other limits or combination of limits may also be provided such that conference server 102 allocates an appropriate level and type(s) of resources to each non-PTT communication device 112.

Figure 4:
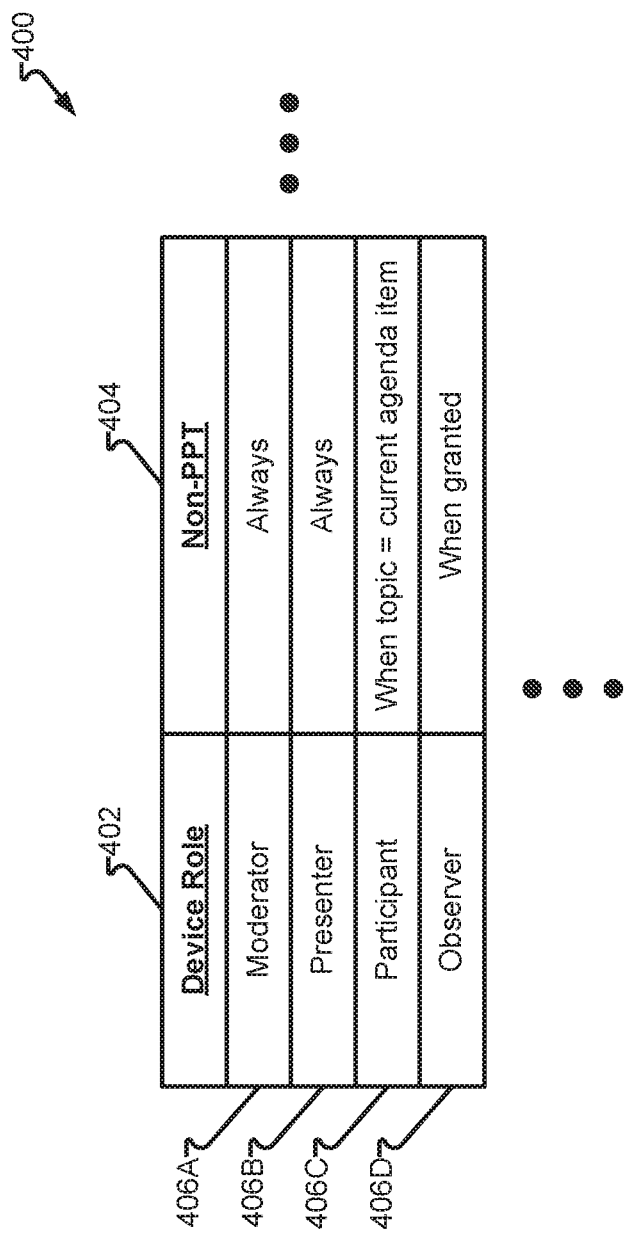
FIG. 4 depicts a third data structure in accordance with embodiments of the present disclosure.

FIG. 4 depicts data structure 400 in accordance with embodiments of the present disclosure. In another embodiment, the role of a participating device may be determined from the role of the associated user of the participating device and the participating device categorized accordingly. In one embodiment, data structure 400 comprises records 406A-D, each comprising device role field 402 and non-PTT field 404. When a conference is created or dynamically during a conference, participating devices, via their associated user, may be designated as having a particular role. This may be a default role which could be subsequently altered. For example, "Moderator" (record 406A) may always be categorized as non-push-to-talk group 108 (non-PTT field 404); "Presenter" (record 406B) may also be always categorized as non-push-to-talk group 108 (non-PTT field 404); "Participant" (record 406C) may be categorized as non-push-to-talk group 108 only when a topic associated with the participant is the same as a current agenda item, which may further be determined utilizing contribution topics field 206 of data structure 200; and "Observer" may be only granted ad hoc access non-push-to-talk group 108, such as to ask a question. Accordingly, with benefit of data structure 400, conference server 102 may set default roles for participants and automatically move a participating device from push-to-talk group 106 to non-push-to-talk group 108.

Figure 5:
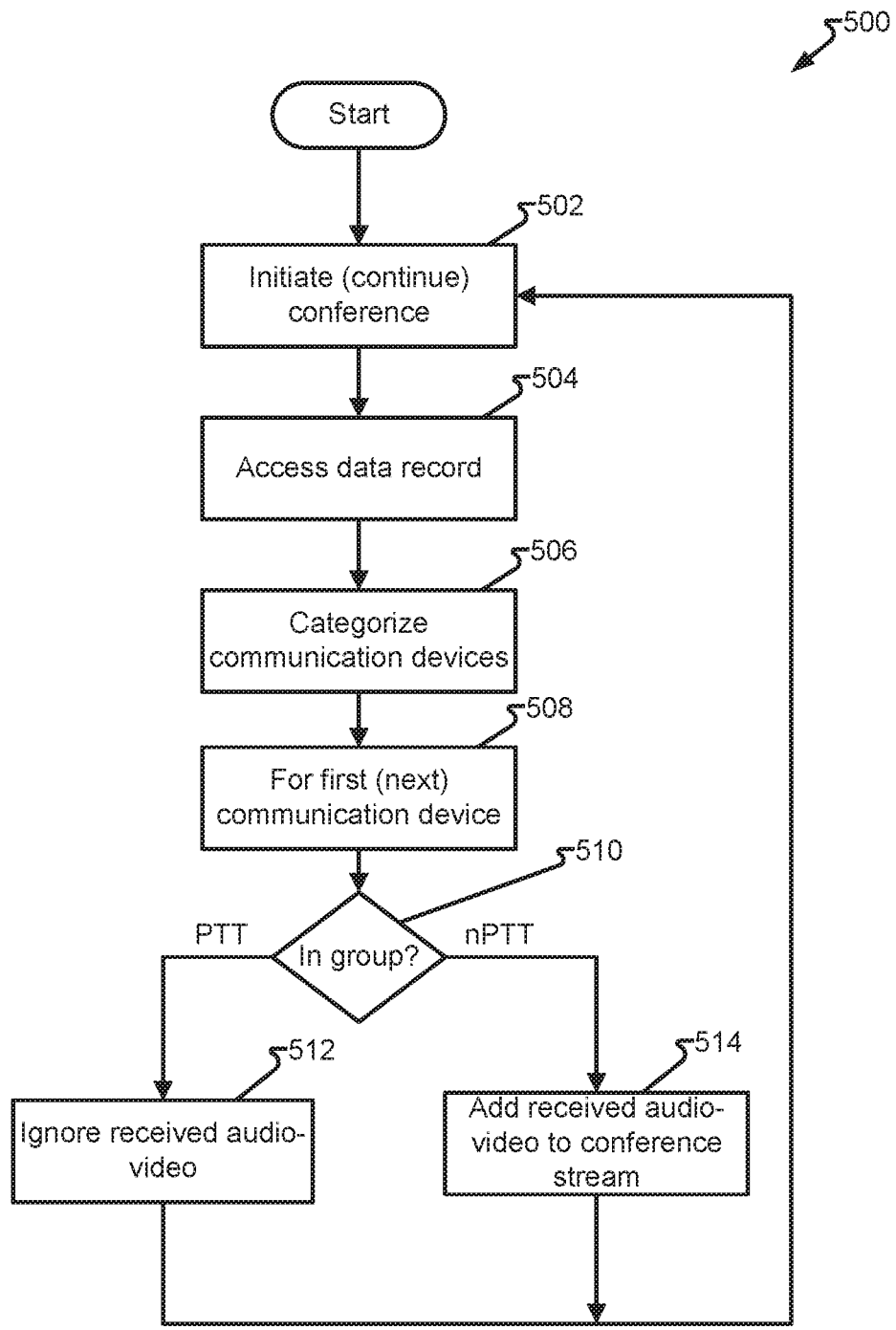
FIG. 5 depicts a process in accordance with embodiments of the present disclosure.

FIG. 5 depicts process 500 in accordance with embodiments of the present disclosure. Process 500 may be embodied as machine-readable and machine-executable instructions, such as may be executed by a processor of conference server 102. In one embodiment, process 500 begins and, at step 502, a conference comprising audio and video content is initiated and streamed out to each participating device. Step 504 accesses a data record, such as one or more of data structures 200, 300, and/or 400 and/or other data structure comprising a datum which may be evaluated against a rule to determine whether a particular participating device, or group of such devices, is to be one of the PTT communication device 110 in group push-to-talk group 106 or one of the non-PTT communication device 112 in the group non-push-to-talk group 108 as categorized in step 506.

Step 506 may categorize the participating device based on an attribute associated with a user of the device (e.g., role, agenda topic to discuss, etc.). Additionally or alternatively, step 506 may be based on a present state of conference server 102 and/or the resources being utilized or soon to be utilized. For example, PTT communication device 110C may signal conference server 102 with a push-to-talk request. If resources are presently underlisted, conference server 102 may immediate grant the request, thereby causing the participating device to become one of non-PTT communication device 112. If resources are presently at a limit, the request may be ensued and granted once resources become available. Similarly, the decision to move a participating device from non-push-to-talk group 108 to push-to-talk group 106 may be based on the device (e.g., stopped contributing content for a previously determined timeframe) and/or the current state of conference server 102. For example, if resources are constrained, one of non-PTT communication device 112 may be reallocated to push-to-talk group 106 in three second after the participating device stops providing conference content. However, if resources are presently underutilized, the move to push-to-talk group 106 may be done in a long time, such as fifteen seconds or not at all.

Next, in step 508, a first communication device is accessed and determined, in test 510, to be in one of push-to-talk group 106 or non-push-to-talk group 108. If test 510 determines that the participating device is to be in push-to-talk group 106, then step 512 ignores any audio and video input received from that particular participating device. In one embodiment, step 512 omits the resource allocation of content receiving resources for such participating devices.

If test 510 is determined in non-push-to-talk group 108 the, resources are allocated and such participating devices when providing audio and/or video conference content are directly added to the conference.

Process 500 may continue back to step 502 wherein the conference is continued to be streamed to each participating device, with the optional exception of any non-PTT communication device 112 that is unable to receive the conference while contributing content to the conference. The steps of process 500 may be continually executed wherein participating devices may automatically, and optionally manually, be moved between non-push-to-talk group 108 and push-to-talk group 106, such as to discuss a particular topic, in response to a push-to-talk request, based on an allocated timeframe, and/or other portion of the conference.

Figure 6:
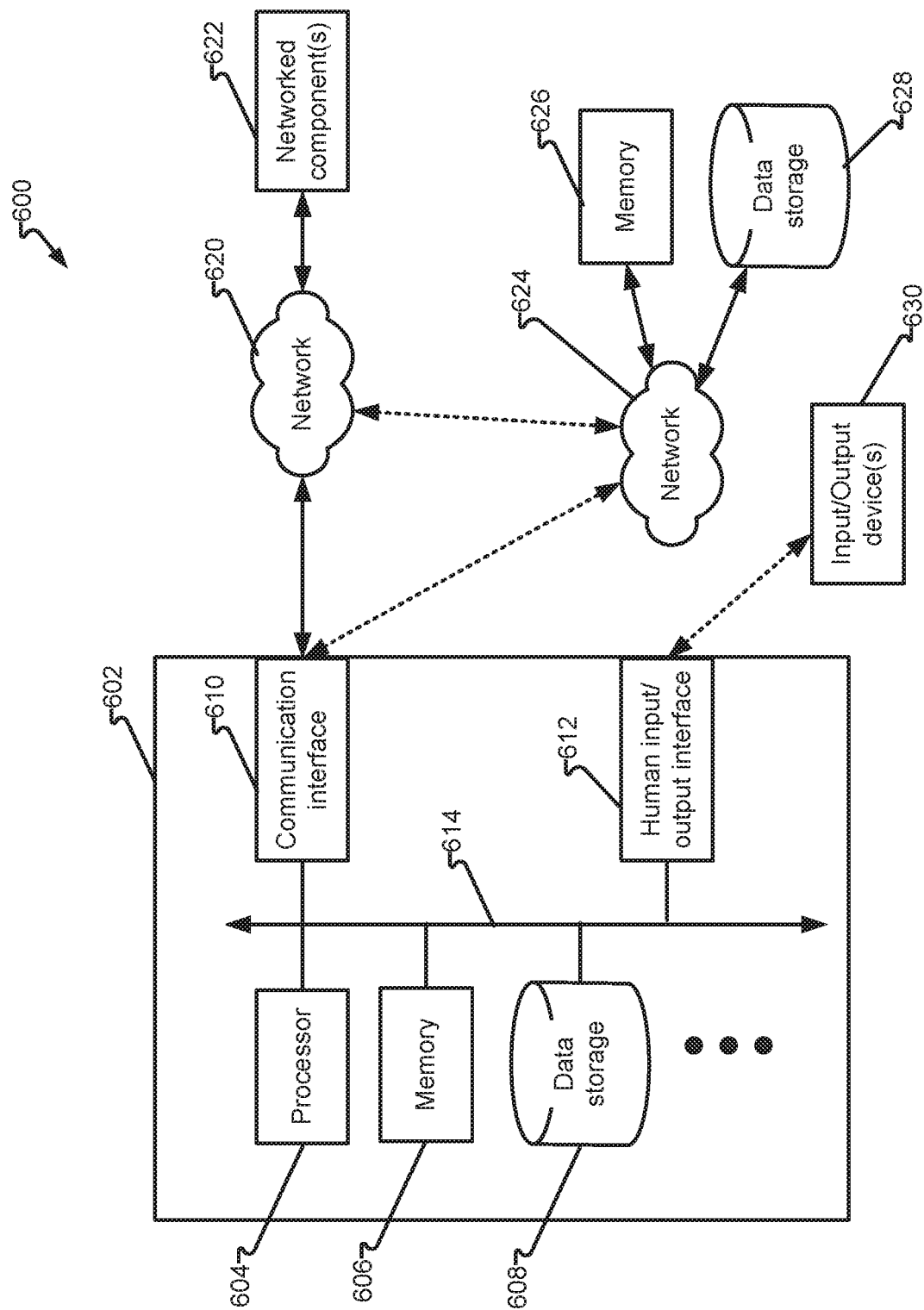
FIG. 6 depicts a second system in accordance with embodiments of the present disclosure.

FIG. 6 depicts device 602 in system 600 in accordance with embodiments of the present disclosure. In one embodiment, participating devices (e.g., PTT communication device 110 and non-PTT communication device 112) may be embodied, in whole or in part, as device 602 comprising various components and connections to other components and/or systems. The components are variously embodied and may comprise processor 604. Processor 604 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 614, executes instructions, and outputs data, again such as via bus 614.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, etc. In another embodiment, communication interface 610 may comprise, or be comprised by, human input/output interface 612. Communication interface 610 may be configured to communicate directly with a networked component or utilize one or more networks, such as network 620 and/or network 624.

Network 114 may be embodied, in whole or in part, as network 620. Network 620 may be a wired network (e.g., Ethernet), wireless (e.g., WiFi, Bluetooth, cellular, etc.) network, or combination thereof and enable device 602 to communicate with network component(s) 622.

Additionally or alternatively, one or more other networks may be utilized. For example, network 624 may represent a second network, which may facilitate communication with components utilized by device 602. For example, network 624 may be an internal network to contact center #02 whereby components are trusted (or at least more so) that networked components 622, which may be connected to network 620 comprising a public network (e.g., Internet) that may not be as trusted. Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620.

It should be appreciated that computer readable data may be sent, received, stored, processed, and presented by a variety of components. It should also be appreciated that components illustrated may control other components, whether illustrated herein or otherwise. For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARIVI926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system comprising:
a network interface to a network;
a data storage comprising a non-transitory data storage component; and
a processor; and
wherein the processor performs:
presenting a conference to communication devices via the network interface and wherein the conference comprises an audio component and a video component;
accessing a data structure maintained in the data storage and determining therefrom a first plurality of the communication devices and a second plurality of the communication devices;
for each of the first plurality of the communication devices, providing video content and audio content received from each of the first plurality of the communication devices as a portion of the audio component of the conference directly into the conference without any further gating decision being performed;
receiving, from a requesting communication device of a second plurality of the communication devices, a request to talk signal;
in response to receiving the request to talk signal, evaluating an attribute associated with at least one of the requesting communication device or a user associated with the requesting communication device;
in response to the evaluation being resolved to grant the request to talk, directly providing video content received from the requesting communication device as at least a portion of the video component of the conference and providing audio content received from the requesting communication device as at least a portion of the audio component of the conference; and
wherein unless granted the request to talk, none of the second plurality of the communication devices provides any portion of the video component of the conference nor any portion of the audio component of the conference.

2. The system of claim 1, wherein the processor automatically reassigns at least one communication device in the second plurality of the communication devices to the first plurality of the communication devices upon evaluating the attribute associated with at least one of the requesting communication device or a user associated with the requesting communication device.

3. The system of claim 1, wherein the processor automatically reassigns at least one communication device in the first plurality of the communication devices to the second plurality of the communication devices upon determining that a quality improvement to the conference would result therefrom for at least a portion of the communication devices.

4. The system of claim 1, wherein the processor automatically reassigns at least one communication device in the second plurality of the communication devices to the first plurality of the communication devices upon determining that resources utilized to present the conference are underutilized.

5. The system of claim 1, wherein the processor performs evaluating the attribute associated with at least one of the requesting communication device or a user associated with the requesting communication device, further comprising the processor evaluating whether the user is associated with a current topic of the conference and granting the request to talk when evaluated in the affirmative.

6. The system of claim 1, wherein the processor performs evaluating the attribute associated with at least one of the requesting communication device or a user associated with the requesting communication device, further comprising the processor evaluating whether the user is a member of a group designated as a contributor of the conference and granting the request to talk when evaluated in the affirmative.

7. The system of claim 1, wherein the processor performs evaluating the attribute associated with at least one of the requesting communication device or a user associated with the requesting communication device, further comprising the processor evaluating whether the requesting communication device has a bandwidth limitation preventing the audio component and the video component to be received at a level of the conference and, throttling at least one of the audio component or the video component when evaluated in the affirmative.

8. The system of claim 7, wherein throttling at least one of the audio component or the video component when evaluated in the affirmative, further comprises, reducing at least one of a frame rate of the video component, resolution of the video component, or fidelity of the audio component.

9. The system of claim 7, wherein throttling at least one of the audio component or the video component when evaluated in the affirmative, further comprises, providing a still image as the video component.

10. The system of claim 1, wherein in response to receiving the request to talk signal, the processor enqueues indicia of the requesting communication device into a queue and, when the indicia is in a first position of the queue, then performs the evaluating of the attribute associated with at least one of the requesting communication device or a user associated with the requesting communication device and removes the indicia from the queue.

11. A method, comprising:
presenting a conference to communication devices via a network and wherein the conference comprises an audio component and a video component;
accessing a data structure maintained in a data storage and determining therefrom a first plurality of the communication devices and a second plurality of the communication devices;
for each of the first plurality of the communication devices, providing video content and audio content received from each of the first plurality of the communication devices as a portion of the audio component of the conference directly into the conference without any further gating decision being performed;

receiving, from a requesting communication device of a second plurality of the communication devices, a request to talk signal;

in response to receiving the request to talk signal, evaluating an attribute associated with at least one of the requesting communication device or a user associated with the requesting communication device; and in response to the evaluation being resolved to grant the request to talk, directly providing video content received from the requesting communication device as at least a portion of the video component of the conference and providing audio content received from the requesting communication device as at least a portion of the audio component of the conference; and wherein unless granted the request to talk, none of the second plurality of the communication devices provides any portion of the video component of the conference nor any portion of the audio component of the conference.

12. The method of claim 11, further comprising automatically reassigns at least one communication device in the second plurality of the communication devices to the first plurality of the communication devices upon evaluating the attribute associated with at least one of the requesting communication device or a user associated with the requesting communication device.

13. The method of claim 11, further comprising automatically reassigns at least one communication device in the first plurality of the communication devices to the second plurality of the communication devices upon determining that a quality improvement to the conference would result therefrom for at least a portion of the communication devices.

14. The method of claim 11, further comprising automatically reassigns at least one communication device in the second plurality of the communication devices to the first plurality of the communication devices upon determining that resources utilized to present the conference are underutilized.

15. The method of claim 11, wherein evaluating the attribute associated with at least one of the requesting communication device or a user associated with the requesting communication device, further comprises evaluating whether the user is associated with a current topic of the conference and granting the request to talk when evaluated in the affirmative.

16. The method of claim 11, wherein evaluating the attribute associated with at least one of the requesting communication device or a user associated with the requesting communication device, further comprises evaluating whether the user is a member of a group designated as a contributor of the conference and granting the request to talk when evaluated in the affirmative.

17. The method of claim 11, wherein evaluating the attribute associated with at least one of the requesting communication device or a user associated with the requesting communication device, further comprises evaluating whether the requesting communication device has a bandwidth limitation preventing the audio component and the video component to be received at a level of the conference and, throttling at least one of the audio component or the video component when evaluated in the affirmative.

18. The method of claim 17, wherein throttling at least one of the audio component or the video component when evaluated in the affirmative, further comprises, reducing at least one of the frame rate of the video component, resolution of the video component, or fidelity of the audio component.

19. The method of claim 17, wherein throttling at least one of the audio component or the video component when evaluated in the affirmative, further comprises, providing a still image as the video component.

20. A system, comprising:

means to present a conference to communication devices via a network and wherein the conference comprises an audio component and a video component;

means to access a data structure maintained in a data storage and determining therefrom a first plurality of the communication devices and a second plurality of the communication devices;

means to, for each of the first plurality of the communication devices, provide video content and audio content received from each of the first plurality of the communication devices as a portion of the audio component of the conference directly into the conference without any further gating decision being performed;

means to receive, from a requesting communication device of a second plurality of the communication devices, a request to talk signal;

means to, in response to receiving the request to talk signal, evaluate an attribute associated with at least one of the requesting communication device or a user associated with the requesting communication device; and means to, in response to the evaluation being resolved to grant the request to talk, directly provide video content received from the requesting communication device as at least a portion of the video component of the conference and providing audio content received from the requesting communication device as at least a portion of the audio component of the conference; and wherein unless granted the request to talk, none of the second plurality of the communication devices provides any portion of the video component of the conference nor any portion of the audio component of the conference.

* * * * *